(12) United States Patent
Wei

(10) Patent No.: US 10,712,860 B2
(45) Date of Patent: Jul. 14, 2020

(54) TOUCH PANEL

(71) Applicants: AU Optronics (Suzhou)Corp, . Ltd; Au Optronics Corporation, Hsinchu (TW)

(72) Inventor: Guangdong Wei, Jiangsu Province (CN)

(73) Assignees: AU Optronics (Suzhou) Corp., Ltd, Jiangsu (CN); Au Optronics Corporation, Hsinchu (TW)

( * ) Notice: Subject to any disclaimer, the term of this patent is extended or adjusted under 35 U.S.C. 154(b) by 0 days.

(21) Appl. No.: 16/152,422

(22) Filed: Oct. 5, 2018

(65) Prior Publication Data

US 2019/0114025 A1   Apr. 18, 2019

(30) Foreign Application Priority Data

Oct. 16, 2017   (CN) .......................... 2017 1 0960304

(51) Int. Cl.
 *G09G 3/20* (2006.01)
 *G06F 3/041* (2006.01)
 *G06F 3/044* (2006.01)

(52) U.S. Cl.
 CPC .......... *G06F 3/0416* (2013.01); *G06F 3/0443* (2019.05); *G06F 3/0446* (2019.05); *G06F 3/0448* (2019.05); *G06F 3/04164* (2019.05); *G09G 3/20* (2013.01); *G06F 2203/04111* (2013.01)

(58) Field of Classification Search
 CPC ............................ G09G 3/20; G02F 1/133514
 USPC ......................................................... 349/106
 See application file for complete search history.

(56) References Cited

U.S. PATENT DOCUMENTS

2009/0273573 A1    11/2009  Hotelling
2010/0141874 A1*   6/2010   Morita .............. G02F 1/133514
                                          349/106
(Continued)

FOREIGN PATENT DOCUMENTS

CN         203773526         8/2014
CN         204360355         5/2015
(Continued)

*Primary Examiner* — Abdul-Samad A Adediran
(74) *Attorney, Agent, or Firm* — JCIPRNET

(57) ABSTRACT

A touch panel including first directional sensing lines, second directional sensing lines, and outer leads is provided. Each of the second directional sensing lines is intersected with at least a portion of the first directional sensing lines, wherein an $i^{th}$ first directional sensing line is not intersected with an $x^{th}$ second directional sensing line in a specific sensing region, the $i^{th}$ first directional sensing line is physically connected with the $x^{th}$ second directional sensing line, and i and x are both positive integers. The first directional sensing lines and the second directional sensing lines are connected to a driving circuit through outer leads, and the $i^{th}$ first directional sensing line and the $x^{th}$ second directional sensing line share a common outer lead.

12 Claims, 13 Drawing Sheets

(56) References Cited

U.S. PATENT DOCUMENTS

2016/0283033 A1 9/2016 Lee et al.
2016/0351098 A1* 12/2016 Lin .................... G09G 3/20

FOREIGN PATENT DOCUMENTS

| CN | 105242814 | 1/2016 |
| CN | 107515698 | 12/2017 |

* cited by examiner

TOUCH PANEL

CROSS-REFERENCE TO RELATED APPLICATION

This application claims the priority benefit of China application serial no. 201710960304.6, filed on Oct. 16, 2017. The entirety of the above-mentioned patent application is hereby incorporated by reference herein and made a part of this specification.

BACKGROUND OF THE INVENTION

Field of the Invention

The invention relates to a panel, and particularly relates to a touch panel.

Description of Related Art

In recent years, touch screens are widely used in mobile phones, tablets, smart watches, smart bracelets and other digital products. Almost all the common touch screens are rectangular, and when there is a need to manufacture circular or non-rectangular screens, wiring planning inside the touch screens may need to be redesigned. In order to achieve circular or non-rectangular touch screens, a more simple and ideal wiring method is to use an X/Y directional wiring that is intersected perpendicularly to each other. However, in terms of the conventional X/Y directional wiring, each sensing line needs an outer lead to be bonded to a driving circuit or a chip. Therefore, a large number of outer leads are needed in order to achieve full-screen touch sensing, and too many outer leads also cause the frame region of the touch screens to be enlarged. When the number of signal transmission channels is big, the requirement for driving circuit is also high, thereby increasing production costs.

SUMMARY OF THE INVENTION

The invention provides a touch panel, wherein the number of outer leads is lesser than the number of sensing lines.

The touch panel of the invention includes first directional sensing lines, second directional sensing lines, and outer leads. Each of the second directional sensing lines is intersected with at least a portion of the first directional sensing lines, wherein an $i^{th}$ first directional sensing line is not intersected with an $x^{th}$ second directional sensing line in a specific sensing region, and the $i^{th}$ first directional sensing line is physically connected with the $x^{th}$ second directional sensing line, and i and x are both positive integers. The outer leads connect the first directional sensing lines and the second directional sensing lines to a driving circuit, and the $i^{th}$ first directional sensing line and the $x^{th}$ second directional sensing line share a common outer lead.

According to an embodiment of the invention, the aforesaid $i^{th}$ first directional sensing line is intersected with M second directional sensing lines in the aforesaid specific sensing region, a $j^{th}$ first directional sensing line is intersected with N second directional sensing line in the specific sensing region, j, M, N are all positive integers, i is different from j, and M is smaller than N.

According to an embodiment of the invention, the aforesaid $j^{th}$ first directional sensing line is intersected with all the second directional sensing lines in the specific sensing region.

According to an embodiment of the invention, a width of the aforesaid specific sensing region at the aforesaid $i^{th}$ first directional sensing line is smaller than a width at the aforesaid $j^{th}$ first directional sensing line.

According to an embodiment of the invention, the aforesaid $x^{th}$ second directional sensing line is intersected with K first directional sensing lines in the aforesaid specific sensing region, a $y^{th}$ second directional sensing line is intersected with L first directional sensing lines in the aforesaid specific sensing region, y, K, L are all positive integers, and K is smaller than L.

According to an embodiment of the invention, the aforesaid $y^{th}$ second directional sensing line is intersected with all the first directional sensing lines in the aforesaid specific sensing region.

According to an embodiment of the invention, the aforesaid outer leads form continuous lines respectively with the first directional sensing lines and the second directional sensing lines connected to the outer leads.

According to an embodiment of the invention, the common outer lead shared by the aforesaid $i^{th}$ first directional sensing line and the aforesaid $x^{th}$ second directional sensing line is connected to the $i^{th}$ first directional sensing line near the edge of the aforesaid specific sensing region.

According to an embodiment of the invention, the common outer lead shared by the aforesaid $i^{th}$ first directional sensing line and the aforesaid $x^{th}$ second directional sensing line is connected to the aforesaid $x^{th}$ second directional sensing line near the edge of the aforesaid specific sensing region.

According to an embodiment of the invention, the common outer lead shared by the aforesaid first directional sensing line and the aforesaid $x^{th}$ second directional sensing line is connected to the physical connection between the $i^{th}$ first directional sensing line and the $x^{th}$ second directional sensing line near the edge of the aforesaid specific sensing region.

According to an embodiment of the invention, an $i1^{th}$ first directional sensing line is physically connected to an $x1^{th}$ second directional sensing line, an $i2^{th}$ first directional sensing line is physically connected to an $x2^{th}$ second directional sensing line, x1, x2, i1 and i2 are all positive integers, and a difference between x1 and x2 is different from a difference between i1 and i2.

According to an embodiment of the invention, a $Y^{th}$ second directional sensing line exists between the aforesaid $x1^{th}$ second directional sensing line and the aforesaid $x2^{th}$ second directional sensing line, and the $Y^{th}$ second directional sensing line is electrically independent of all the first directional sensing lines.

Based on the above, the first directional sensing line and the second directional sensing line of the touch panel that are not intersected with each other in the specific sensing region share a common outer lead so that the number of outer leads may be reduced, thereby reducing the area required to set the outer leads, and expanding the borderless region at the same time. The first directional sensing line and the second directional sensing line which share a common outer lead also share a common signal transmission channel, so that the requirements for the driving circuit are relatively low. Therefore, the touch panel of the invention may significantly reduce the number of the outer leads and signal transmission channels, thereby reducing the overall production cost and having a faster refresh rate and operational speed.

To make the above features and advantages of the invention more comprehensible, embodiments accompanied with drawings are described in detail as follows.

DETAILED DESCRIPTION OF DISCLOSED EMBODIMENTS

Figure 1A:
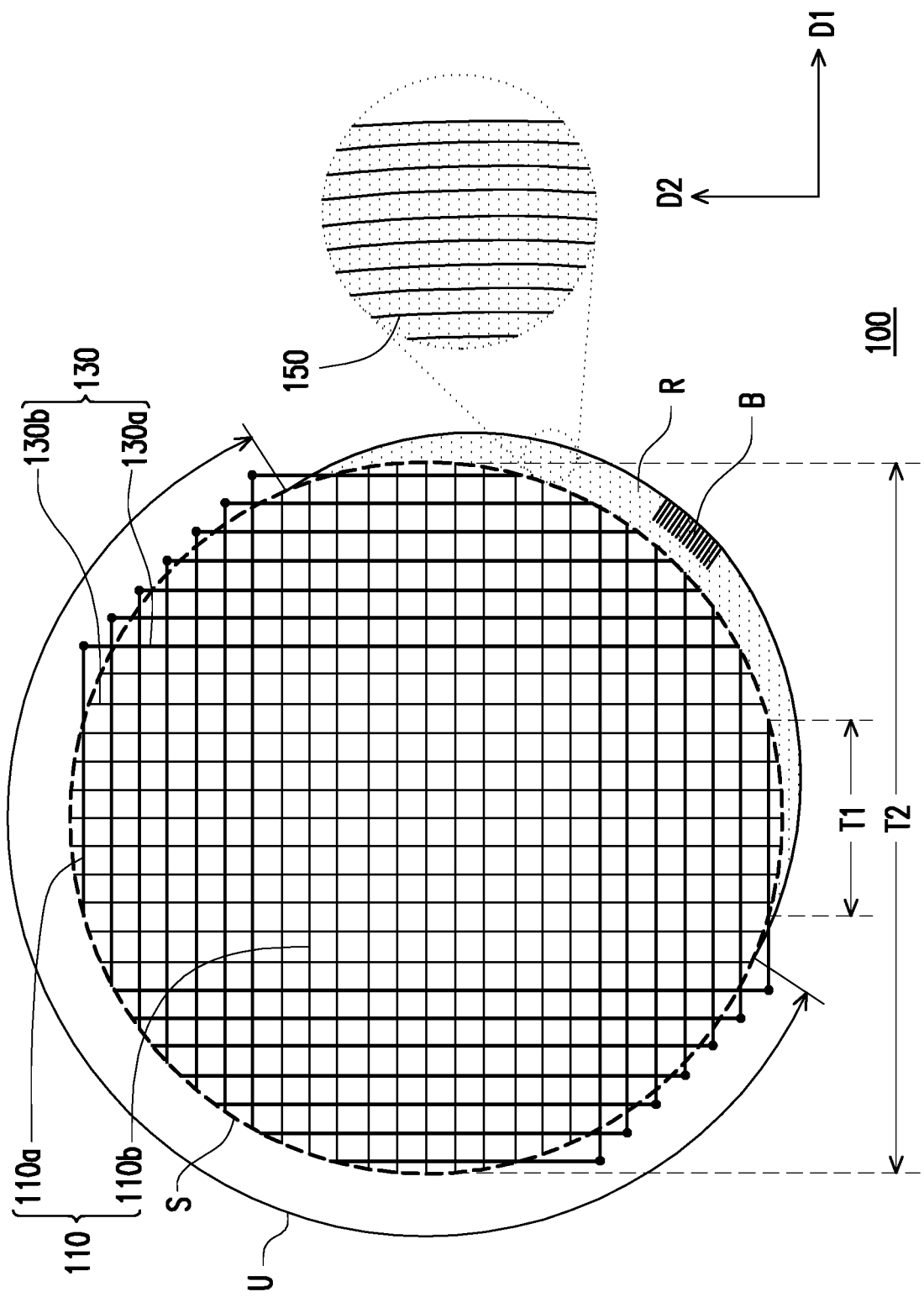
FIG. 1A is a schematic top view of a touch panel according to an embodiment of the invention.

FIG. 1A is a schematic top view of a touch panel according to an embodiment of the invention. For clarity, FIG. 1A only schematically shows sensing lines inside the touch panel and a periphery wiring region R connected thereto, and shows a partially enlarged view of the periphery wiring region R. Referring to FIG. 1A, a touch panel 100 includes first directional sensing lines 110 extending along a first direction D1, second directional sensing lines 130 extending along a second direction D2 and outer leads 150. Each of the second directional sensing lines 130 is intersected with at least a portion of the first directional sensing lines 110, and each of the first directional sensing lines 110 is intersected with at least a portion of the second directional sensing lines 130. The outer leads 150 are distributed along the periphery wiring region R without being intersected with each other, and are concentrated at a bounding region B. An external driving circuit, a chip or a circuit board may be bonded to the bounding region B of the touch panel 100 so as to be electrically connected with the aforesaid outer leads 150, thereby connecting the first directional sensing lines 110 and the second directional sensing lines 130 to the driving circuit.

In the embodiment of the invention, the first directional sensing line 110 and the second directional sensing line 130 may define a touch sensing point at a mutual intersection in a specific sensing region S, and all the touch sensing points are set in the specific sensing region S to provide effective touch sensing function. To be specific, the specific sensing region S, for example, is a display region in a non-rectangular shape, and the first directional sensing lines 110 and the second direction sensing lines 130 respectively extends along the first direction D1 and the second direction D2. Therefore, not all the first directional sensing lines 110 will be intersected with all the second directional sensing lines 130 in the specific sensing region S, and not all the second directional sensing lines 130 will be intersected with all the first directional sensing lines 110 in the specific sensing region S.

In an embodiment of the invention, the first directional sensing lines 110 may be categorized into first directional sensing lines 110a and first directional sensing lines 110b, and the second directional sensing lines 130 may be categorized into second directional sensing lines 130a and second directional sensing lines 130b. Each of the first directional sensing lines 110a and corresponding one of the second directional sensing lines 130a are not intersected with each other within the specific sensing region S and are physically connected with each other outside the specific sensing region S. Each of the first directional sensing line 110b is not physically connected to any of the second directional sensing line 130, and each of the second directional sensing line 130b is not physically connected to any of the first directional sensing line 110. In other words, an $i^{th}$ first directional sensing line 110a and an $x^{th}$ second directional sensing line 130a may be physically connected to each other in the embodiment of the invention, a $j^{th}$ first directional sensing line 110b is not physically connected to any of the second directional sensing line 130, and a $y^{th}$ second directional sensing line 130b is not physically connected to any of the first directional sensing line 110. The first directional sensing line 110a and the $x^{th}$ second directional sensing line 130a which are physically connected to each other may share a common outer lead 150. The $j^{th}$ first directional sensing line 110b and the $y^{th}$ second directional sensing line 130b are each connected to an independent outer lead 150. The aforesaid algebra, i, j, x and y, are all positive integers. Therefore, in an embodiment of the invention, the number of outer leads 150 is lesser than the sum of the number of the first directional sensing lines 110 and the second directional sensing lines 130. Here, the algebra i is used to represent the order of the first directional sensing lines 110a in all the first directional sensing lines 110, and the algebra j is used to represent the order of the first directional sensing lines 110b in all the first directional sensing lines 110, and thus i is different from j. Similarly, the algebra x is used to represent the order of the second directional sensing lines 130a in all the second directional sensing lines 130, and the algebra y is used to represent the order of the second directional sensing lines 130b in all the second directional sensing lines 130, and thus x is different from y.

Figure 2:
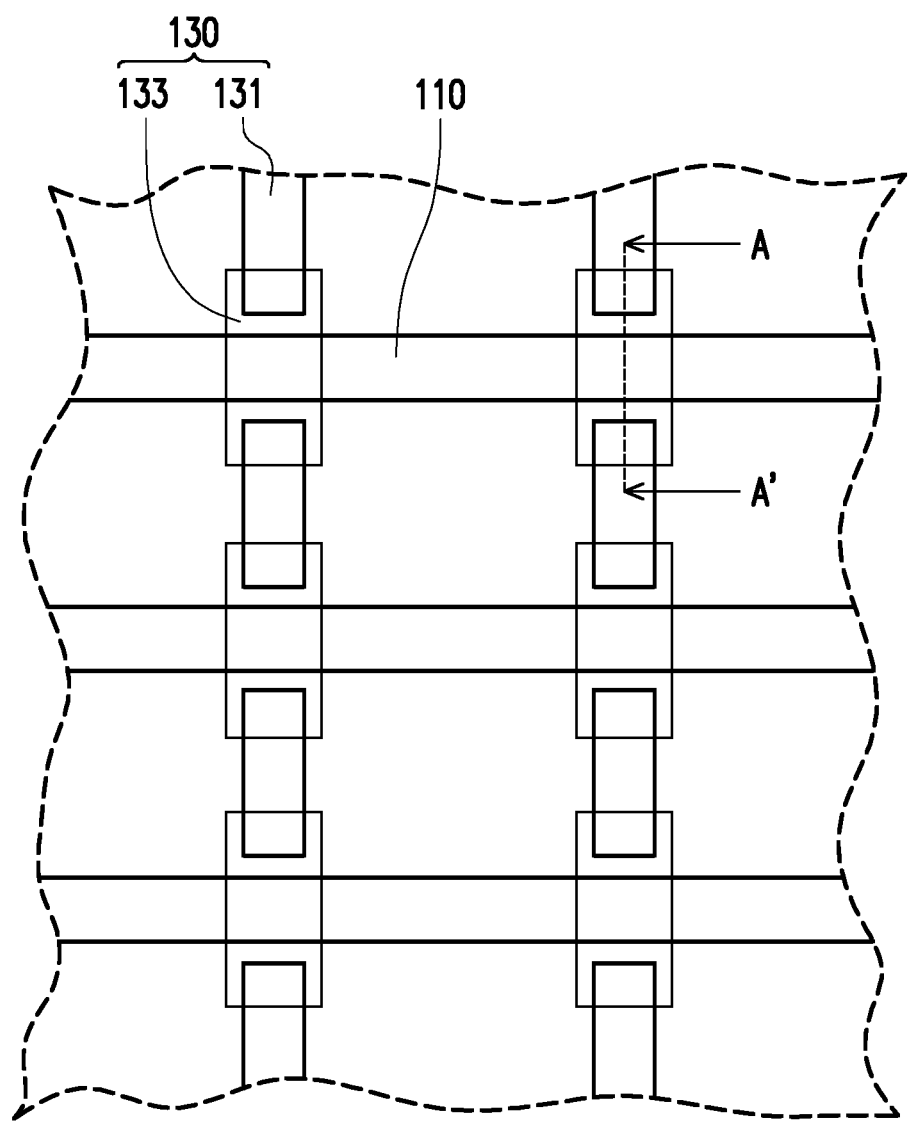
FIG. 2 is a partially enlarged schematic view of the touch panel of FIG. 1A in a specific sensing region S.
Figure 3A:
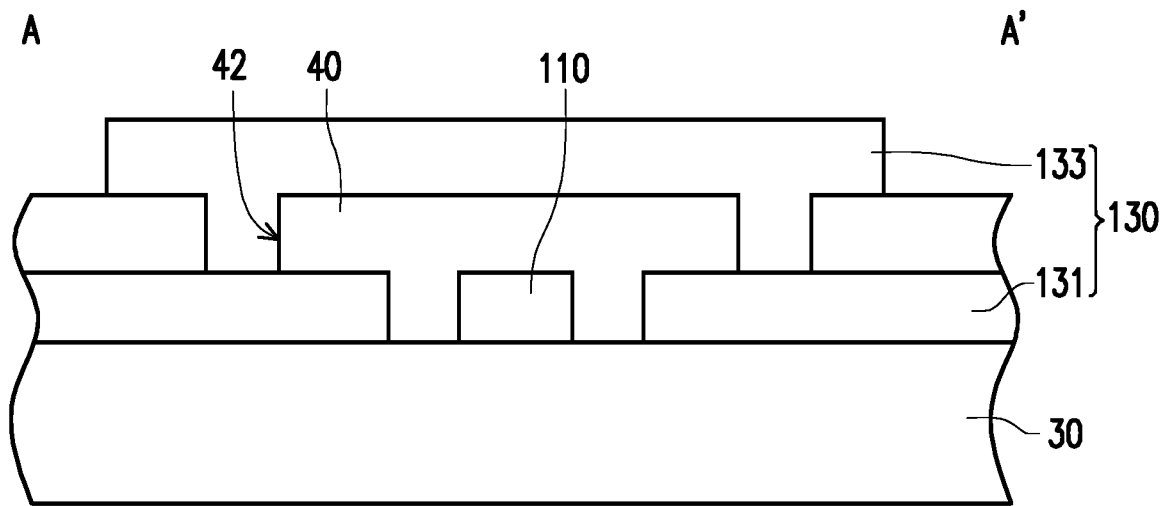
FIG. 3A is a schematic cross-sectional view taken along sectional line A-A' in FIG. 2.
Figure 3B:
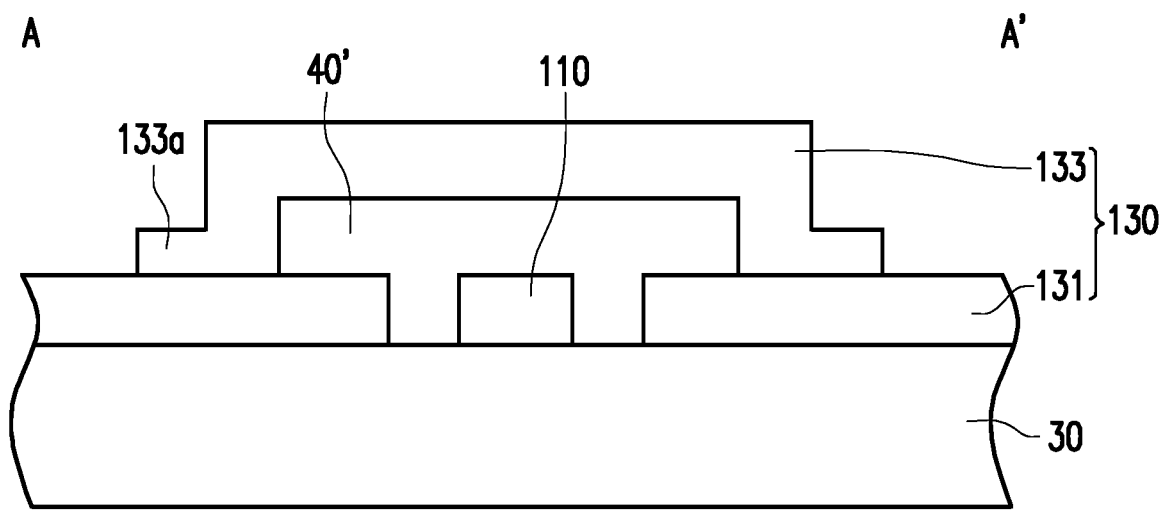
FIG. 3B is a schematic cross-sectional view of another state taken along sectional line A-A' in FIG. 2.

FIG. 2 is a partially enlarged schematic view of the touch panel of FIG. 1A in the specific sensing region S. FIG. 3A is a schematic cross-sectional view taken along sectional line A-A' in FIG. 2. Referring to FIG. 2 and FIG. 3A, the first directional sensing lines 110, the second directional sensing lines 130 and an insulating layer 40 are configured on a substrate 30 (as shown in FIG. 3A). The second directional sensing line 130 includes a plurality of first conductive segments 131 separated from each other, and a second conductive segment 133 bridging the two adjacent first conductive segments 131. In the embodiment of the invention, the first directional sensing lines 110 and the first conductive segments 131 may be formed by patterning a same conductive layer, the insulating layer 40 is disposed on the conductive layer of the first directional sensing lines 110 and the first conductive segments 131, and the second conductive segment 133 is formed by another conductive layer disposed on the insulating layer 40. The insulating layer 40 has an opening 42 for the second conductive segment 133 to be electrically in contact with the first conductive segment 131 at the opening 42. The first directional sensing line 110 is intersected with the second conductive segment 133 of the second directional sensing line 130, but the insulating layer 40 is disposed between the corresponding first directional sensing line 110 and the second conductive segment 133 so that the first directional sensing line 110 is not electrically in contact with the second directional sensing line 130. There are many other possible states of the second conductive segment 133 of the second directional sensing line 130 and the insulating layer 40, while people of ordinary skills in the art may make the appropriate selection according to actual needs. For example, FIG. 3B is a schematic cross-sectional view of another state taken along sectional line A-A' in FIG. 2, wherein an insulating layer 40', for example, has an island-shaped structure and the end portion 133a of the second conductive segment 133 is in contact with the first conductive segment 131 so that the second conductive segment 133 covers the insulating layer 40' having the island-shaped structure.

While still referring to FIG. 1A, in the embodiment of the invention, a width T1 of the specific sensing region S measured along the first direction D1 at the first directional sensing line 110a is less than a width T2 measured along the first direction D1 at the first directional sensing line 110b. Therefore, each of the first directional sensing lines 110a is intersected with M second directional sensing lines 130 in the specific sensing region S, and each of the first directional sensing lines 110b intersects with N second directional sensing lines 130 in the specific sensing region S, wherein M and N are positive integers, and M is smaller than N. Specifically, the $j^{th}$ first directional sensing line 110b is close to the center of the touch panel 100, and thus it is possibly intersected with all the second directional sensing lines 130 in the specific sensing region S. The $i^{th}$ first directional sensing line 110a is relatively close to the edge of the touch panel 100, and thus it is intersected with fewer second directional sensing lines 130 in the specific sensing region S, wherein i is different from j.

Similarly, the width of the specific sensing region S measured along the second direction D2 at the second directional sensing line 130a will also be smaller than the width measured along the second direction D2 at the second directional sensing line 130b. Each of the second directional sensing lines 130a intersects K first directional sensing lines 110 in the specific sensing region S, and each of the second directional sensing lines 130b intersects L first directional sensing lines 110 in the specific sensing region S, wherein K and L are both positive integers, and K is smaller than L. That is to say, the $y^{th}$ second directional sensing lines 130b may be intersected with all the first directional sensing lines 110 in the specific sensing region S, and the $x^{th}$ second directional sensing lines 130a is intersected fewer first directional sensing lines 110 in the specific sensing region S, wherein x is different from y.

Figure 1B:
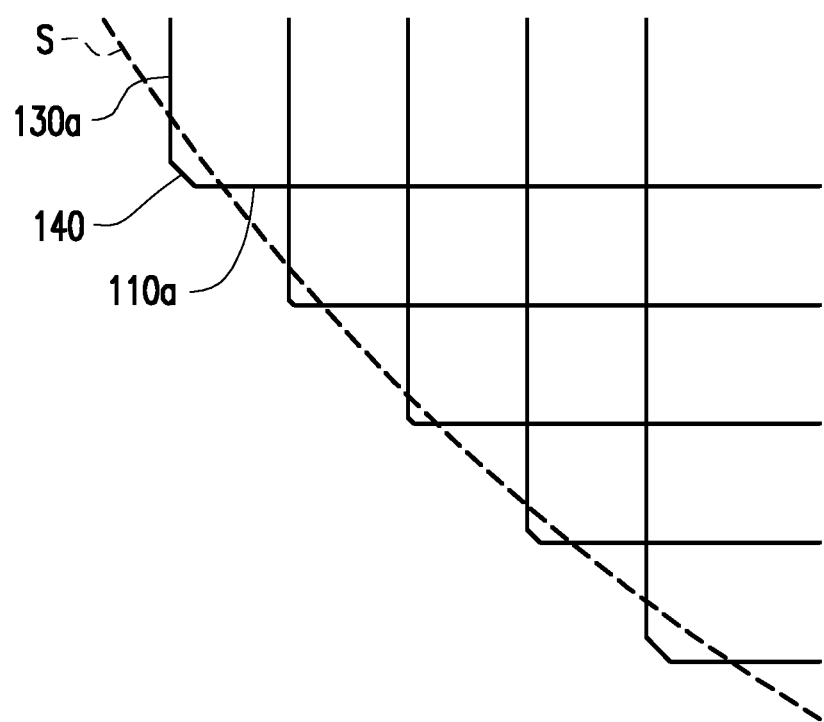
FIG. 1B is a partially enlarged schematic view of an edge of a specific sensing region of the touch panel according to an embodiment of the present invention.

In the embodiment of the invention, the outer leads 150 form continuous lines respectively with the first directional sensing lines 110 and the second directional sensing line 130 connected to the outer leads 150. The common outer lead 150 shared by the $i^{th}$ first directional sensing line 110a and the $x^{th}$ second directional sensing line 130a may be connected to the $i^{th}$ first directional sensing line 110a near the edge of the specific sensing region S, may be connected to the $x^{th}$ second directional sensing line 130a, or may be connected to the physical connection between the $i^{th}$ first directional sensing line 110a and the $x^{th}$ second directional sensing line 130a. In FIG. 1A, for example, the physical connection is schematically indicated by a dot pattern, but is not limited thereto. The physical connection, for example, may be a line segment 140 disposed near the edge of the specific sensing region S and located outside the specific sensing region S, for example, as shown in FIG. 1B.

Referring to FIG. 1A, the common outer lead 150 shared by the $i^{th}$ first directional sensing line 110a and the $x^{th}$ second directional sensing line 130a may extend toward the bounding region B from one end of the $i^{th}$ first directional sensing line 110a away from the physical connection, may extend toward the bounding region B from one end of the x second directional sensing line 130a away from the physical connection, or may extend toward the bounding region B from the physical connection between the $i^{th}$ first directional sensing line 110a and the $x^{th}$ second directional sensing line 130a.

Here, it should be noted that the positional terms, upper, lower, left or right of the following paragraphs are only for convenience of description and are not intended to limit the invention. Using FIG. 1A as an example, the periphery wiring region R is set on the lower right side of the touch panel 100, wherein the outer lead 150 shared by the $i^{th}$ first directional sensing line 110a located on the lower portion of the touch panel 100 and the $x^{th}$ second directional sensing line 130a located on the left portion of the touch panel 100 extends toward the bounding region B from one end of the $i^{th}$ first directional sensing line 110a away from the physical connection, and the outer lead 150 shared by the $i^{th}$ first directional sensing line 110a located on the upper portion of the touch panel 100 and the $x^{th}$ second directional sensing line 130a located on the right portion of the touch panel 100 extends toward the bounding region B from one end of the $x^{th}$ second directional sensing line 130a away from the physical connection. Furthermore, the outer lead 150 of the first directional sensing line 110b that does not share the outer lead 150 extends toward the bounding region B from the right end of the first directional sensing line 110b, and the outer lead 150 of the $y^{th}$ second directional sensing line 130b that does not share the outer lead 150, extends toward the bounding region B from the lower end of the second directional sensing line 130b, but the invention is not limited hereto. In other embodiments, the outer leads 150 of the first directional sensing lines 110b may also extend toward the bounding region B from the left end of the first directional sensing line 110b, and the outer leads 150 of the second directional sensing lines 130b may also extend toward the bounding region B from the upper end of the second directional sensing line 130b, while people of ordinary skills in the art may make the appropriate choice based on actual needs.

Figure 4:
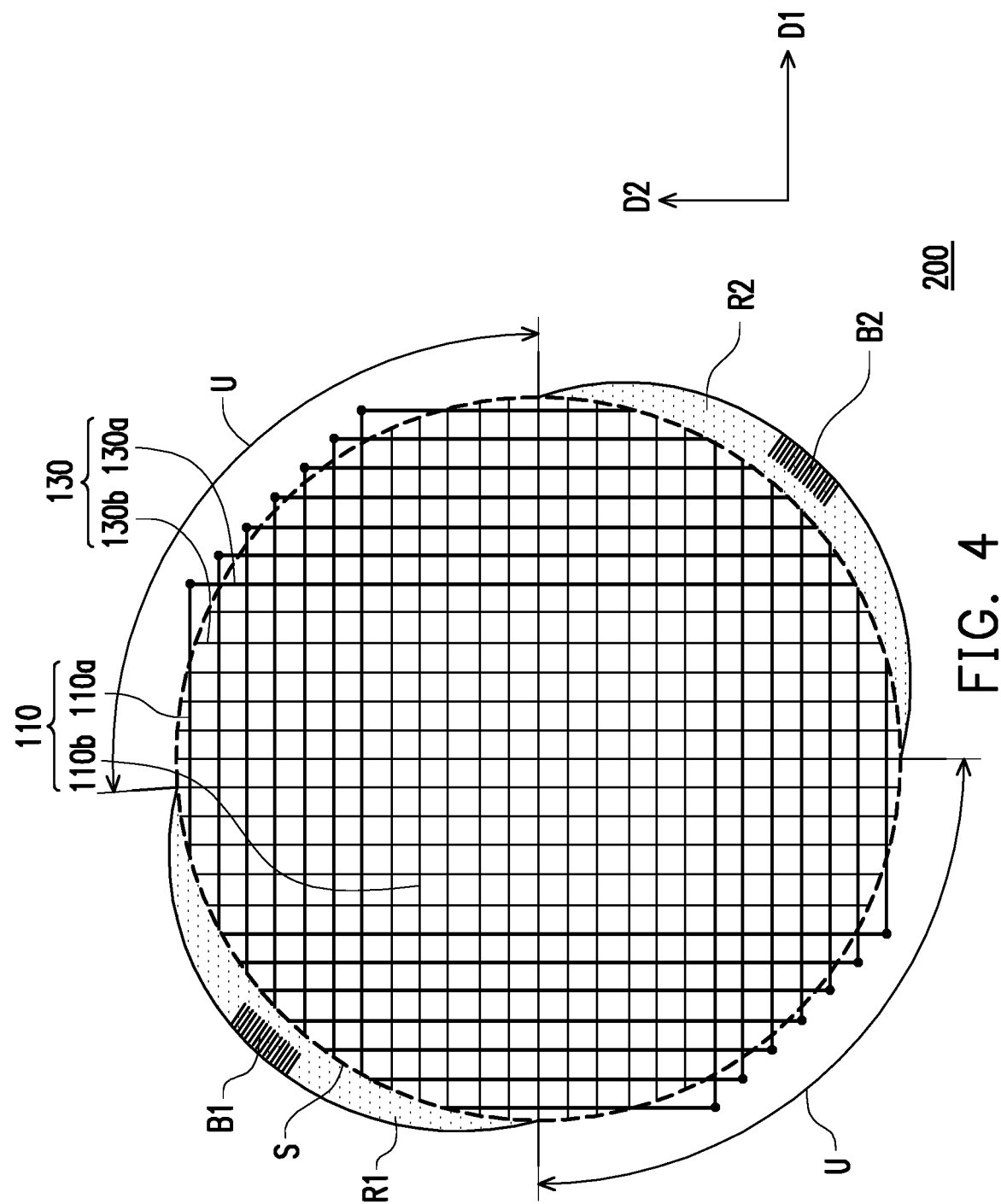
FIG. 4 to FIG. 5 are schematic top views of the touch panels according to other embodiments of the invention.
Figure 5:
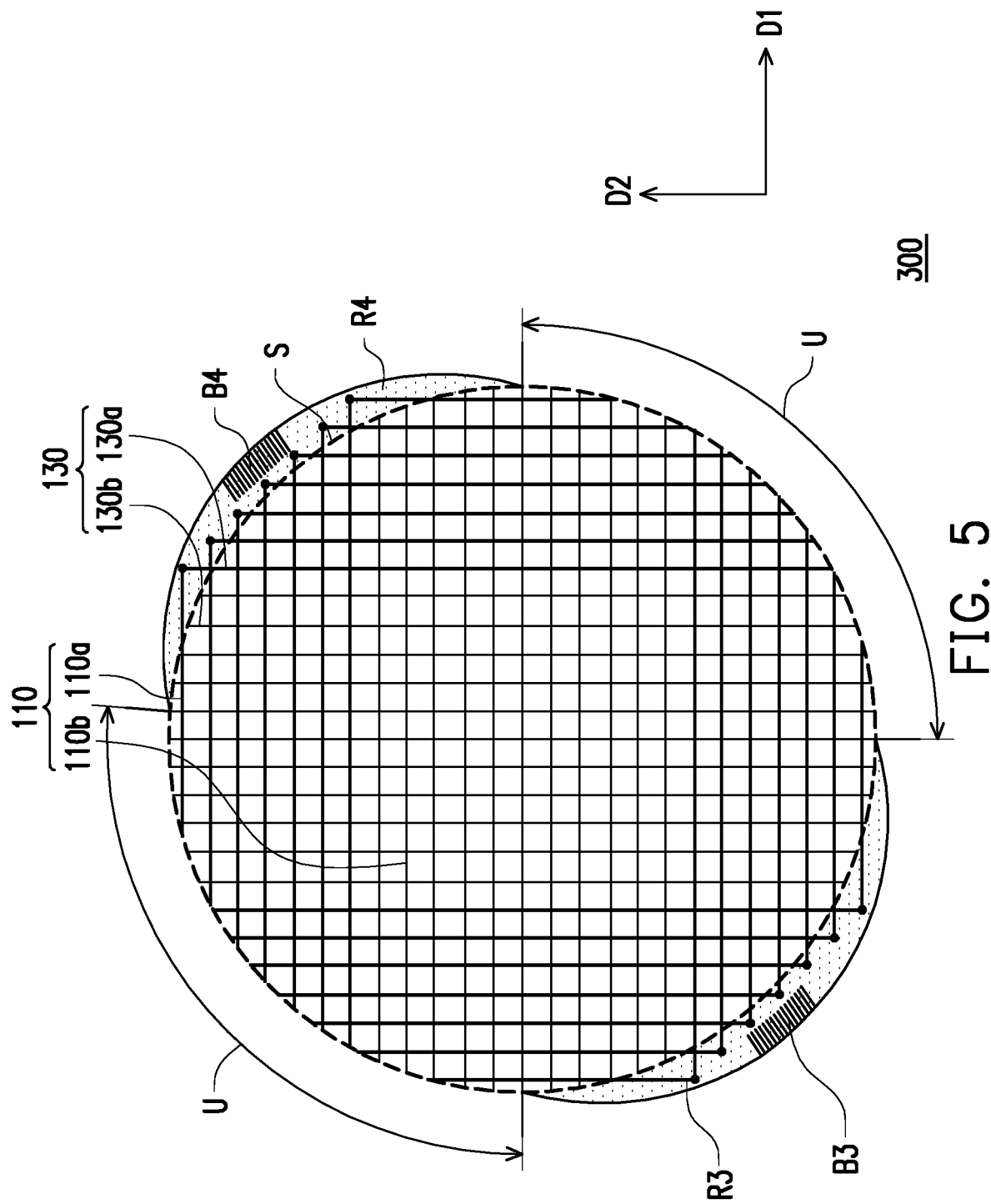

FIG. 4 to FIG. 5 are schematic top views of the touch panels according to other embodiments of the invention. Referring to FIG. 4 and FIG. 5, touch panel 200 and touch panel 300 are substantially similar to the touch panel 100, while the main difference lies in the connection position of the outer lead 150 and the range of the periphery wiring region R. Referring to FIG. 4, in the embodiment of the invention, a periphery wiring region R1 and a periphery wiring region R2 are respectively set on the upper left and lower right sides of the touch panel 200, wherein the outer lead 150 shared by the first directional sensing line 110a located on the lower portion of the touch panel 200 and the second directional sensing line 130a located on the left portion of the touch panel 200 extends toward a bounding region B2 from one end of the lower first directional sensing line 110a away from the physical connection, and the outer lead 150 shared by the first directional sensing line 110a located on the upper portion of the touch panel 200 and the second directional sensing line 130a located on the right portion of the touch panel 200 extends toward a bounding region B1 from one end of the upper first directional sensing line 110a away from the physical connection. Alternatively, the outer lead 150 shared by the first directional sensing line 110a located on the lower portion of the touch panel 200 and the second directional sensing line 130a located on the left portion of the touch panel 200 may extend toward the bounding region B1 from one end of the left second directional sensing line 130a away from the physical connection, and the outer lead 150 shared by the first directional sensing line 110a located on the upper portion of the touch panel 200 and the second directional sensing line 130a located on the right portion of the touch panel 200 may all extend toward the bounding region B2 from one end of the right second directional sensing line 130a away from the physical connection.

Furthermore, the outer lead 150 of the first directional sensing line 110b of the upper half portion of the touch panel 200 extends toward the bounding region B1 from the left end of the first direction sensing line 110b, the outer lead 150 of the first directional sensing line 110b of the lower half portion of the touch panel 200 extends toward the bounding region B2 from the right end of the first directional sensing line 110b, the second directional sensing line 130b of the left half portion of the touch panel 200 extends toward the bounding region B1 from the upper end of the second directional sensing line 130b, and the second directional sensing line 130b of the right half portion of the touch panel 200 extends toward the bounding region B2 from the lower end of the second directional sensing line 130b.

Referring to FIG. 5, in the touch panel 300, a periphery wiring region R3 and a periphery wiring region R4 are respectively set on the lower left and upper right sides of the touch panel 300, wherein the outer lead 150 shared by the first directional sensing line 110a located on the lower portion of the touch panel 300 and the second directional sensing line 130a located on the left portion of the touch panel 300 extends toward a bounding region B3 from the physical connection of the two sensing lines. The outer lead 150 shared by the first directional sensing line 110a located on the upper portion of the touch panel 300 and the second directional sensing line 130a located on the right portion of the touch panel 300 extends towards a bounding region B4 from the physical connection of the two sensing lines. Furthermore, the outer lead 150 of the first directional sensing line 110b on the upper half portion of the touch panel 300 extends toward a bounding region B4 from the right end of the first direction sensing line 110b, the outer lead 150 of the first directional sensing line 110b of the lower half portion of the touch panel 300 extends toward the bounding region B3 from the left end of the first directional sensing line 110b, and the second directional sensing line 130b of the left half portion of the touch panel 300 extends toward the bounding region B3 from the lower end of the second directional sensing line 130b, and the second directional sensing line 130b of the right half portion of the touch panel 300 extends toward the bounding region B4 from the upper end of the second directional sensing line 130b.

In the embodiment of the invention, since the $i^{th}$ first directional sensing line 110a and the $x^{th}$ second directional sensing line 130a share a common outer lead 150, the number of the outer leads 150 may be reduced, the border size of the touch screen may be reduced, and the range of the borderless region U may be enlarged at the same time. As illustrated in FIG. 1A, the range of the borderless region U of the touch panel 100 is larger than one-half of the periphery region. Alternatively, as illustrated in FIG. 4 or FIG. 5, the range of the borderless region U of the touch panel 200 or the touch panel 300 is substantially equal to one-half of the periphery region. In contrast, in the traditional wiring method, a sensing line requires an outer lead. Therefore, the periphery wiring region where the outer lead is located needs to occupy three-quarters of the periphery region of the touch panel. That is, the borderless region is only one quarter of the periphery region of the touch panel. Therefore, the touch panel 100, touch panel 200 or touch panel 300 may have a smaller border and a larger range of borderless region which may provide livelier variability for a subsequent process or application.

Figure 6A:
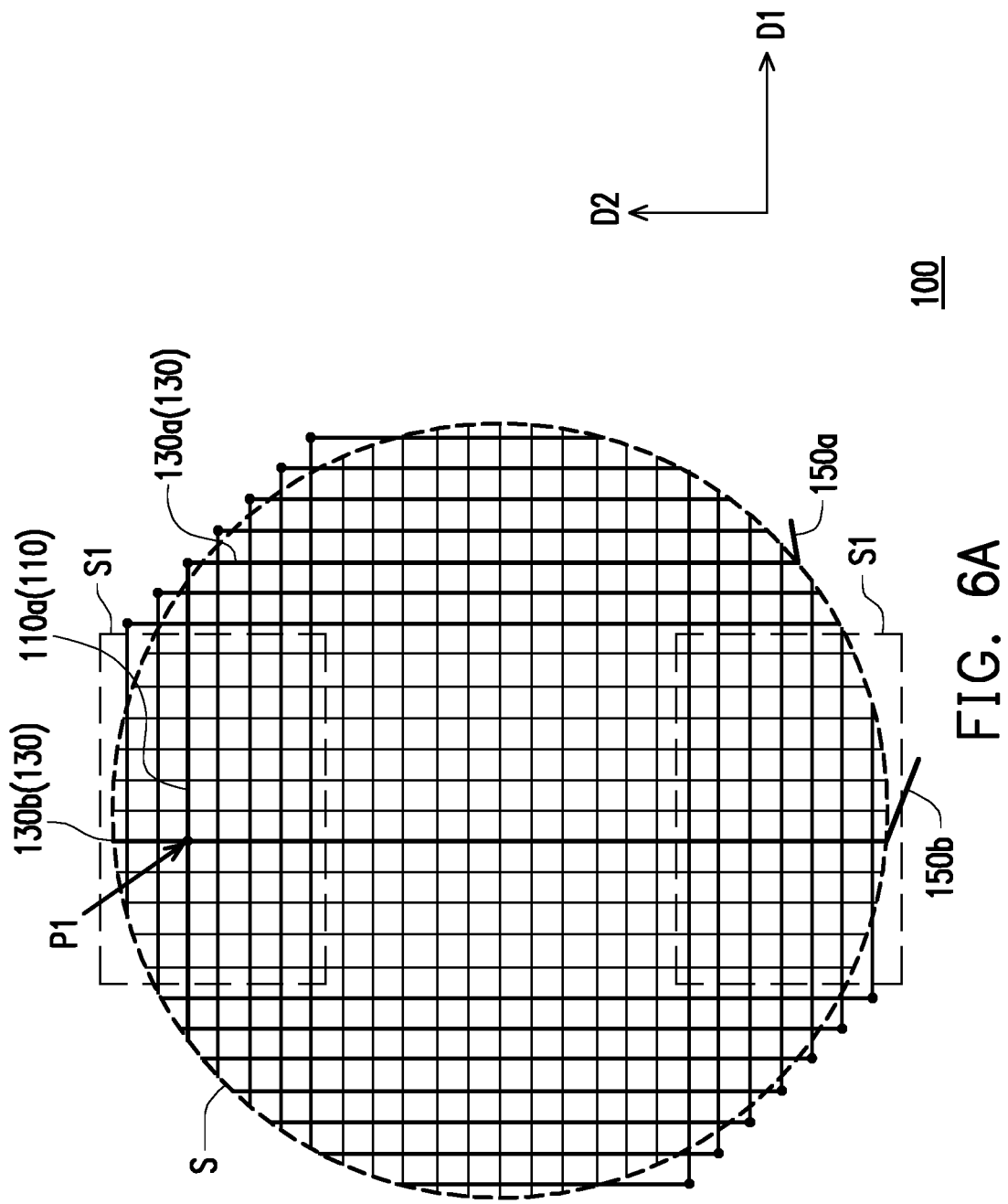
FIG. 6A to FIG. 6D illustrate sensing methods of respective regions in a touch panel 100, respectively.

The sensing method of any one of the touch panel 100 to the touch panel 300 may be to select one of the outer leads 150 to input a driving signal and to read a sensing signal from the other outer leads 150. In order to clearly describe the sensing method of the touch panel of an embodiment of the invention, FIG. 6A to FIG. 6D are specially illustrated to describe the sensing methods of respective regions in the touch panel, respectively. Referring to FIG. 6A, a first sensing region S1 is a region where the first directional sensing lines 110a and the second directional sensing lines 130b are intersected. In the first sensing region S1, if a user touches a touch position P1 in the first sensing region S1 in FIG. 6A, one of the common outer lead 150a shared by the first directional sensing line 110a and the $x^{th}$ second directional sensing line 130a and the outer lead 150b of the $y^{th}$ second directional sensing line 130b will be inputted a driving signal, and the other will receive a sensing signal of the touch action, whereby the coordinate of the touch position P1 is (y, i).

Figure 6B:
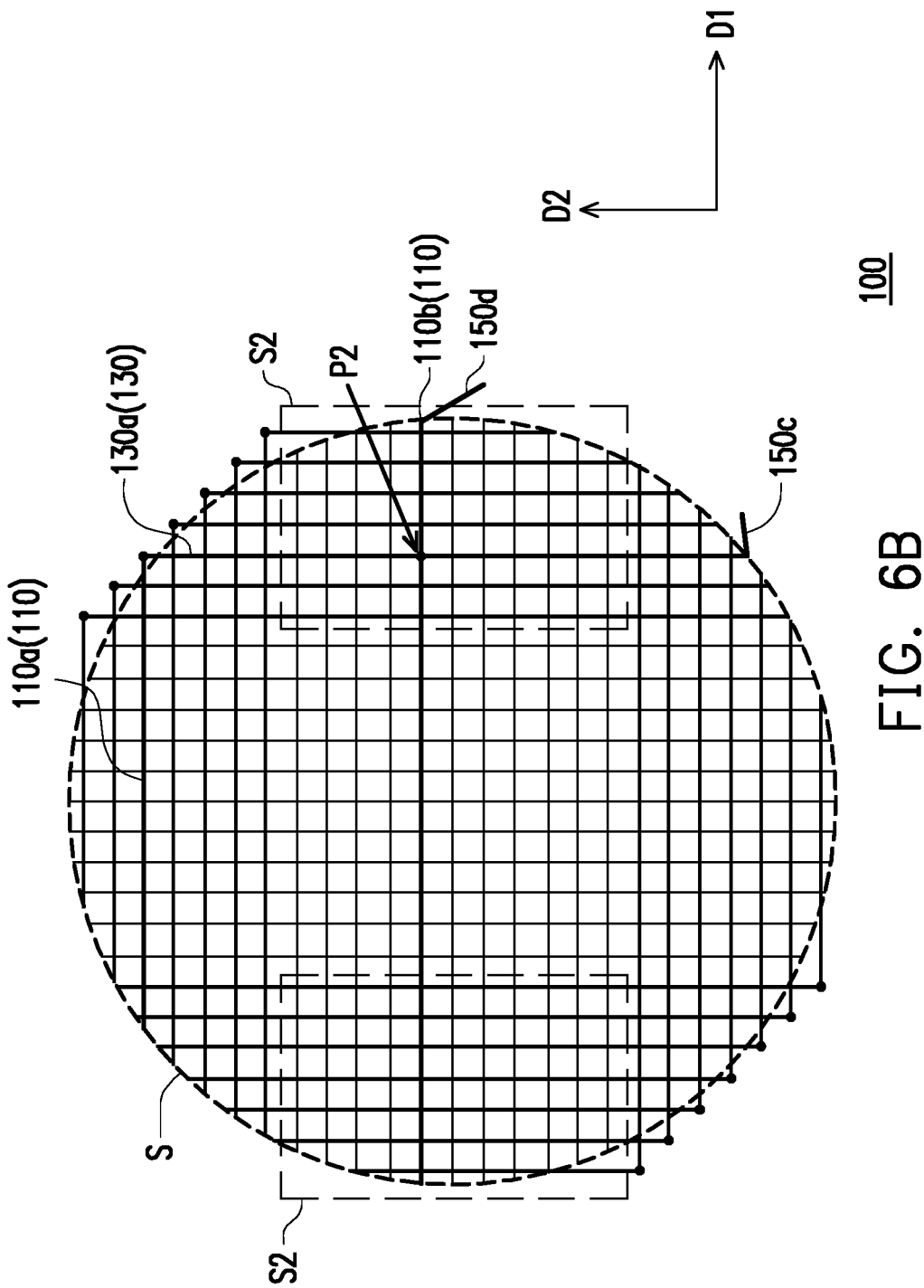

Referring to FIG. 6B, a second sensing region S2 is a region where the second directional sensing lines 130a and the first directional sensing lines 110b are intersected. In the second sensing region S2, if a user touches a touch position P2 in the second sensing region S2 in FIG. 6B, one of the common outer lead 150c shared by the first directional sensing line 110a and the $x^{th}$ second directional sensing line 130a and the outer lead 150d of the $j^{th}$ first directional sensing line 110b will be inputted a driving signal, and the other will receive a sensing signal of the touch action, whereby the coordinates of the touch position P2 is (x, j).

Figure 6C:
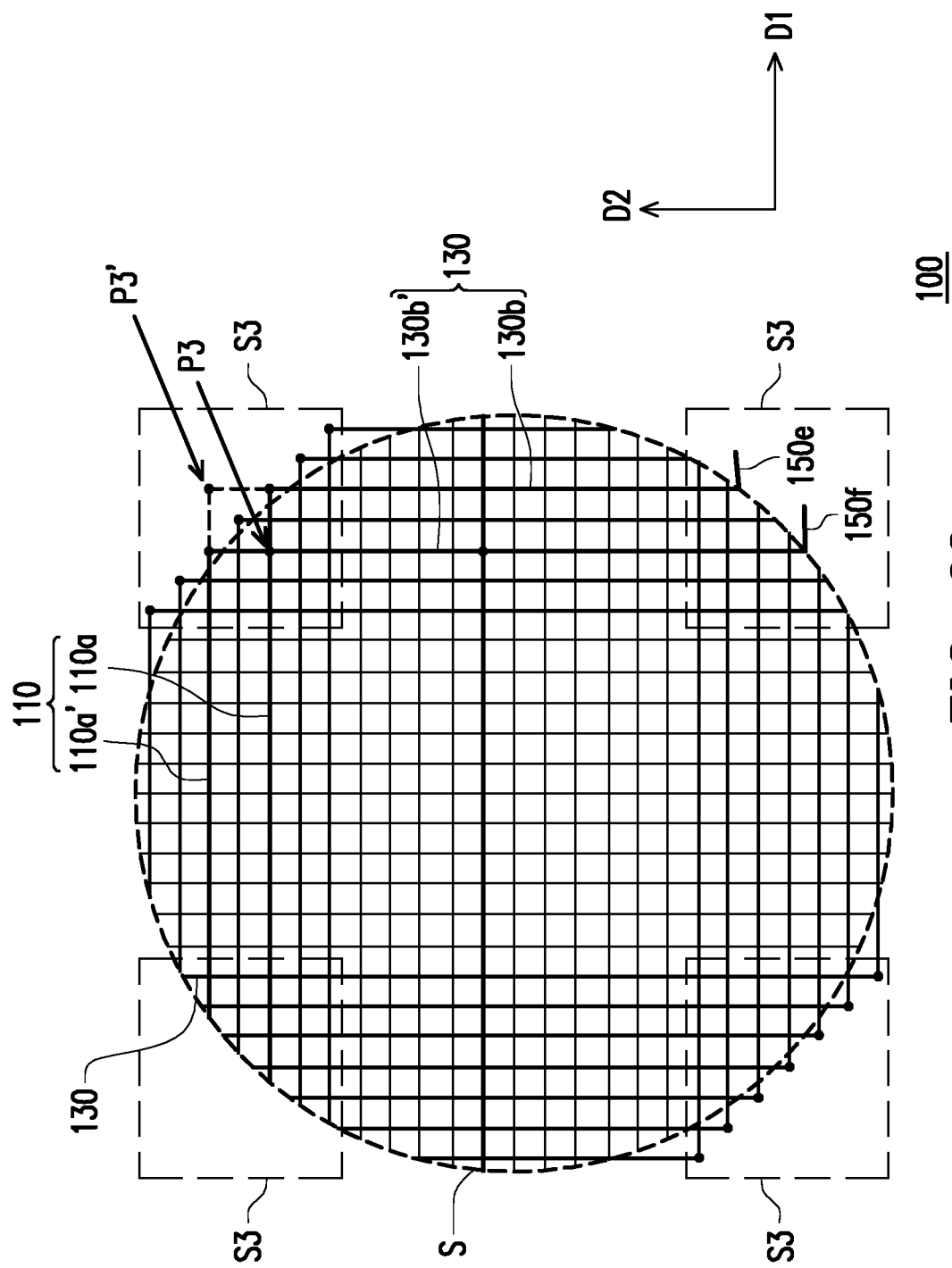

Referring to FIG. 6C, a third sensing region S3 is a region where two sets of the first directional sensing lines 110a and the second directional sensing lines 130a physically connected to each other are intersected. In the third sensing region S3, if a user touches a touch point P3 within the third sensing region S3 in FIG. 6C, one of the common outer lead 150e shared by the $i^{th}$ first directional sensing line 110a and the $x^{th}$ second directional sensing line 130a and the outer lead 150f shared by the $i'^{th}$ first directional sensing line 110a' and the $x'^{th}$ second directional sensing line 130a' will be inputted a driving signal, and the other will receive a sensing signal of the touch action, wherein x' and i' are positive integers, thereby determining that one of (x', i) and (x, i') which falls within the specific sensing region S is the coordinate of the touch position P3. At this point, one of the coordinate (x', i) and coordinate (x, i') outside the specific sensing region S is regarded as an invalid position P3'.

Figure 6D:
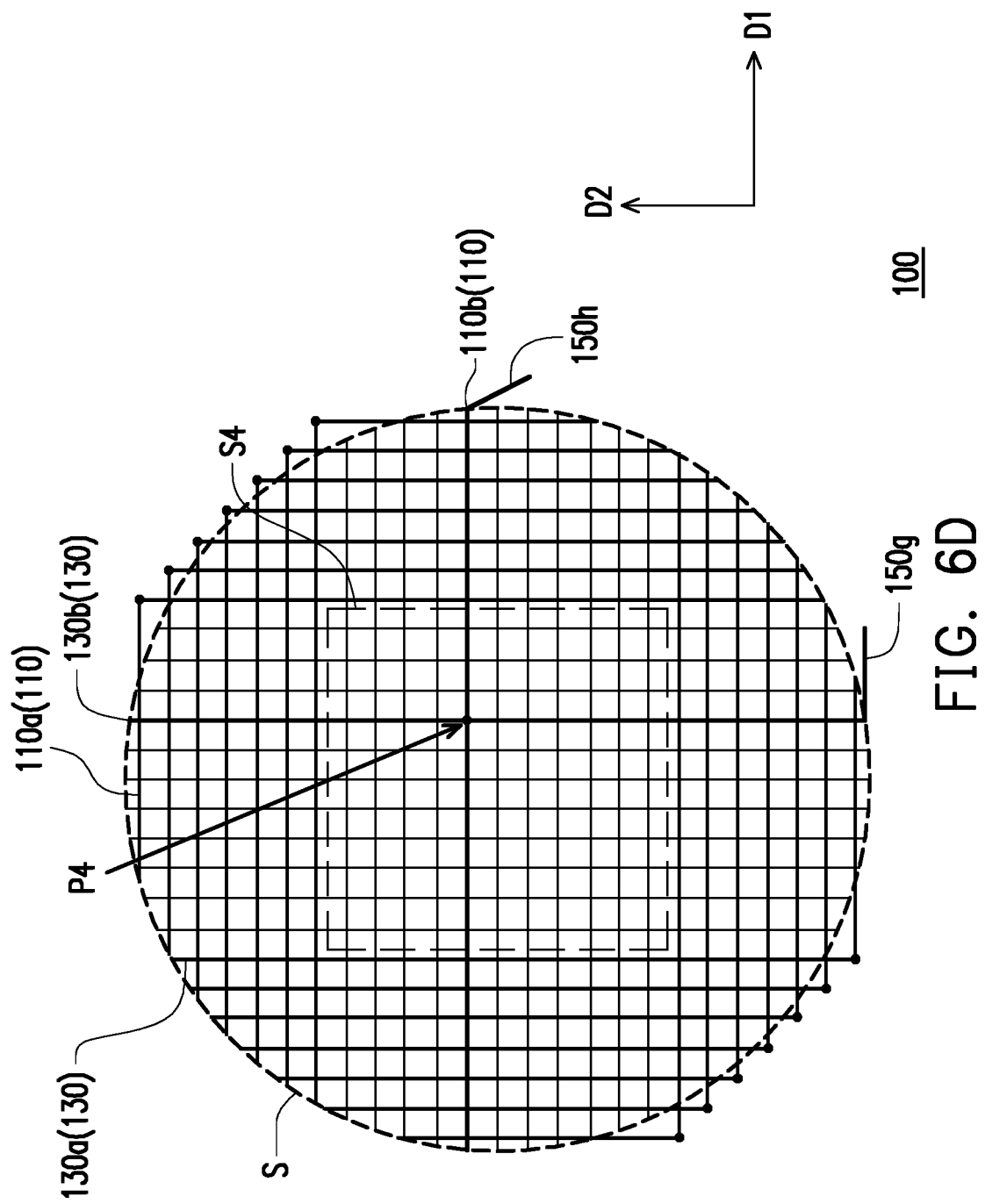

Referring to FIG. 6D, a fourth sensing region S4 is a region where the second directional sensing lines 130b and the first directional sensing lines 110b are intersected. In the fourth sensing region S4, if a user touches a touch position P4 in the fourth sensing region S4 in FIG. 6D, one of the outer lead 150g connected to the $y^{th}$ second directional sensing line 130b that is not physically connected to the first directional sensing line 110 and the outer lead 150h of the $j^{th}$ first directional sensing line 110b will be inputted a driving signal, and the other will receive a sensing signal of a touch action, whereby the coordinate of the touch position P4 is (y, j). Therefore, the sensing method by dividing the touch panel into the first sensing region S1 to the fourth sensing region S4 may allow full-screen touch sensing being achieved even though a portion of the first directional sensing lines 110 and a portion of the second directional sensing lines 130 of the touch panel share the outer leads 150. That is, all sensing points in the specific sensing region S may be distinguished correctly.

Figure 7:
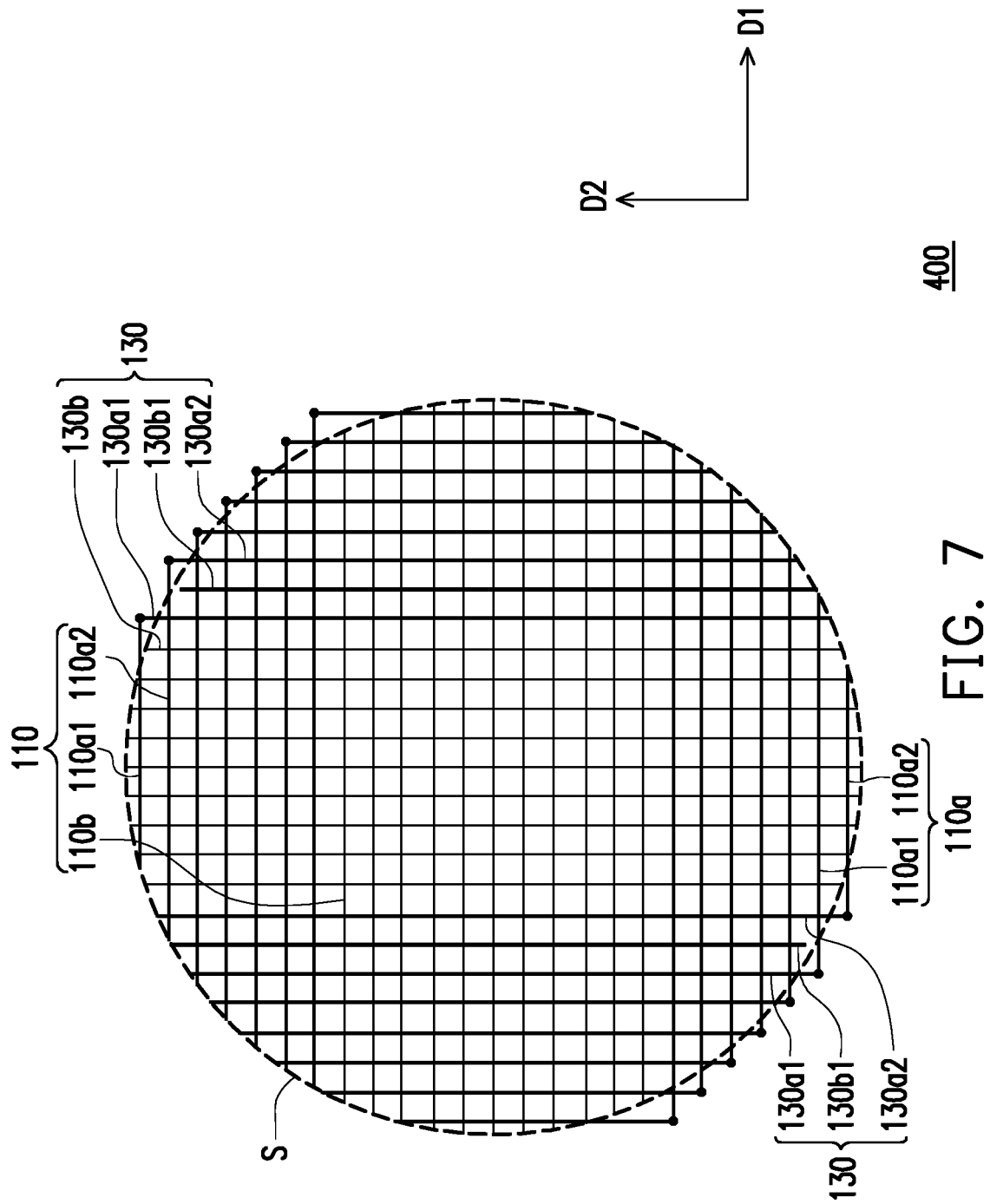
FIG. 7 is a schematic top view of a touch panel according to an embodiment of the invention.

FIG. 7 is a schematic top view of a touch panel according to an embodiment of the invention. Referring to FIG. 7, touch panel 400 is similar to the touch panel 100, but the $i1^{th}$ first directional sensing line 110a1 of the touch panel 400 is physically connected to the $x1^{th}$ second directional sensing line 130a1, the $i2^{th}$ first directional sensing line 110a2 is physically connected to the $x2^{th}$ second directional sensing line 130a2, wherein x1, x2, i1 and i2 are all positive integers, and the difference between x1 and x2 is different from the difference between i1 and i2. Therefore, a $Y^{th}$ second directional sensing line 130b1 exists between the $x1^{th}$ second directional sensing line 130a1 and the $x2^{th}$ second directional sensing line 130a2, and the $Y^{th}$ second directional sensing line 130b1 is electrically independent of all the first directional sensing lines 110.

For example, if the first directional sensing lines 110 are sequentially numbered from top to bottom and the second directional sensing lines 130 are sequentially numbered from left to right, in the right portion of the touch panel 400, x1=18, x2=20, i1=1, and i2=2. As illustrated in FIG. 7, the $1^{th}$ first directional sensing line 110a1 is physically connected to the $18^{th}$ second directional sensing line 130a1, and the $2^{nd}$ first directional sensing line 110a2 is physically connected to the $20^{th}$ second directional sensing line 130a2. At the same time, the $19^{th}$ second directional sensing line 130b1 (as represented by the thickest line in FIG. 7) exists between the $18^{th}$ second directional sensing line 130a1 and the $20^{th}$ second directional sensing line 130a2, and the $19^{th}$ second directional sensing line 130b1 is electrically independent of all the first directional sensing lines 110. In the left portion of the touch panel 400, x1=6, x2=8, i1=24, and i2=25. As illustrated in FIG. 7, the $24^{th}$ first directional sensing line 110a1 is physically connected to the $6^{th}$ second directional sensing line 130a1, and the $25^{th}$ first directional sensing line 110a2 is physically connected to the $8^{th}$ second directional sensing line 130a2. At the same time, the $7^{th}$ second directional sensing line 130b1 (as represented by the thickest line in FIG. 7) exists between the $6^{th}$ second directional sensing line 130a1 and the $8^{th}$ second directional sensing line 130a2, and the $7^{th}$ second directional sensing line 130b1 is electrically independent of all the first directional sensing lines 110.

In the embodiment of the invention, the sensing method of the touch panel 400 is substantially similar to that of the touch panel 100, the difference between them is that the $Y^{th}$ second directional sensing line 130b1 exists between the $x1^{th}$ second directional sensing line 130a1 and the $x2^{th}$ second directional sensing line 130a2, wherein the sensing method thereof is the same as that of other second directional sensing lines 130b that are not physically connected to the first directional sensing lines 110. In other words, in the region where the $Y^{th}$ second directional sensing line 130b1 and the $i^{th}$ first directional sensing line 110a are intersected, the sensing method of the first sensing region S1 of FIG. 6A is used for sensing, and in the region where the $Y^{th}$ second directional sensing line 130b1 and the $i^{th}$ first directional sensing line 110b are intersected, the sensing method of the fourth sensing region S4 of FIG. 6D is used for sensing.

Figure 8:
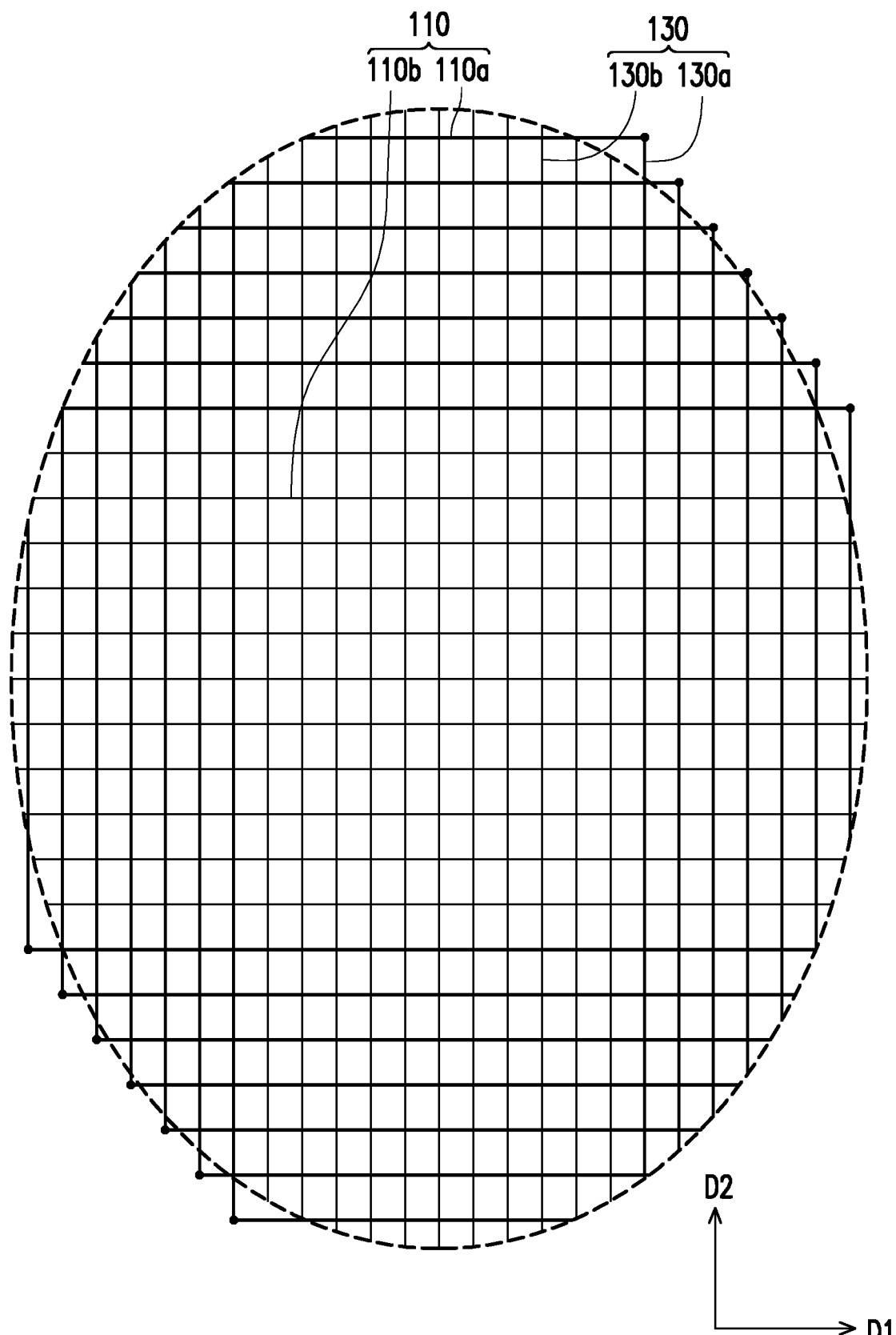
FIG. 8 is a schematic top view of a touch panel according to an embodiment of the invention.

FIG. 8 is a schematic top view of a touch panel according to an embodiment of the invention. Referring to FIG. 8, touch panel 500 is substantially similar to the touch panel 100, the main difference is that the touch panel 500 has a specific sensing region S in an oval shape, wherein reference may be made to the related description of the embodiment of the touch device 100 for the component parts and the sensing method, and it will not be further described herein. Specifically, first directional sensing lines 110 extending along the first direction D1, and second directional sensing lines 130 extending along the second direction D2 are disposed in the specific sensing region S of the touch panel 500. The first directional sensing lines 110 may be classified into the first directional sensing lines 110a and the first directional sensing lines 110b, and the second directional sensing lines 130 may be classified into the second directional sensing lines 130a and the second directional sensing lines 130b. Specifically, each of the first directional sensing line 110a is physically connected to one of the second directional sensing lines 130a, each of the first directional sensing lines 110b is not physically connected to any of the second directional sensing lines 130, and each of the second directional sensing line 130b is not physically connected to any of the first directional sensing lines 110. Therefore, each of the first directional sensing line 110a and corresponding one of the second directional sensing lines 130a may share one outer lead, which helps to reduce the number of outer leads and reduce the configuration area required for the outer leads.

Figure 9:
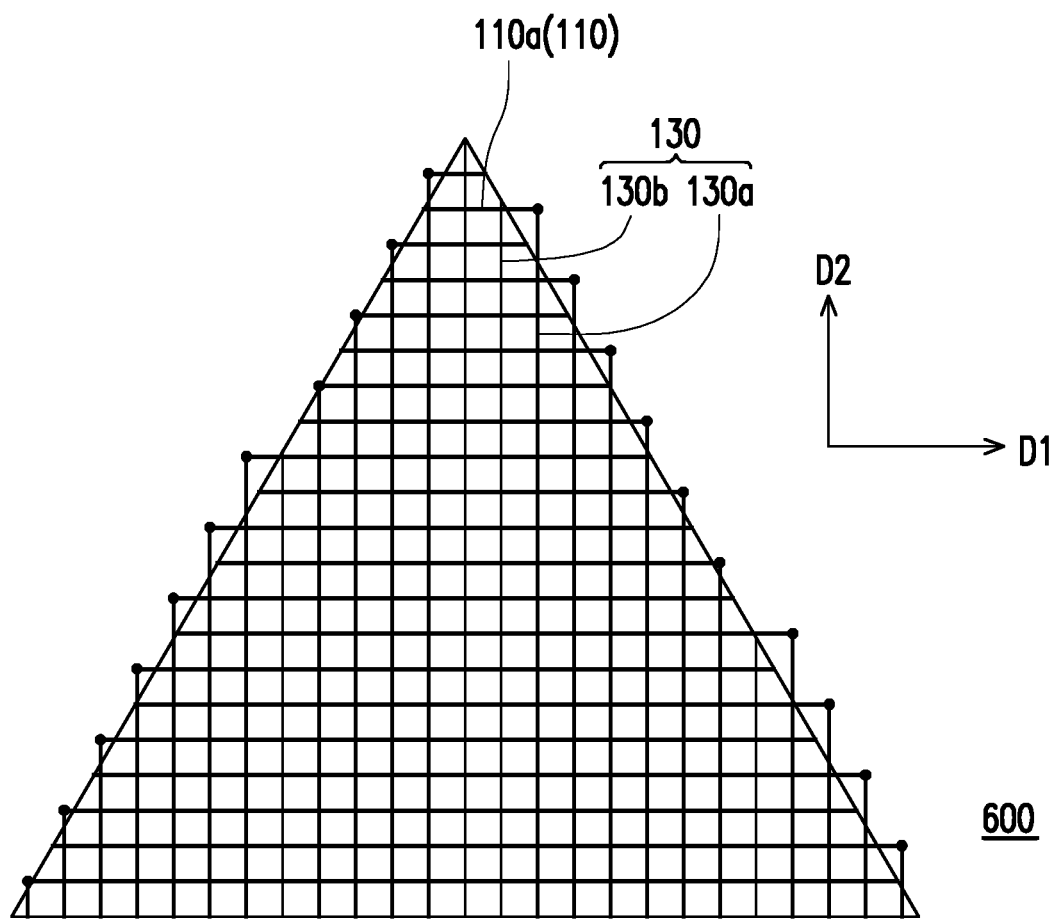
FIG. 9 is a schematic top view of a touch panel according to an embodiment of the invention.

FIG. 9 is a schematic top view of a touch panel according to an embodiment of the invention. Referring to FIG. 9, the difference between a touch panel 600 and the touch panel 100 is that the shape of the specific sensing region S of the touch panel 600 is triangular. Specifically, first directional sensing lines 110 extending along the first direction D1 and second directional sensing lines 130 extending along the second direction D2 are disposed in the specific sensing region S of the touch panel 600. Each of the first directional sensing lines 110 is physically connected to one of the second directional sensing lines 130 in the embodiment of the invention, and therefore it belongs to the first directional sensing line 110a. The second directional sensing lines 130 may be classified into the second directional sensing lines 130a and the second directional sensing lines 130b. In the embodiment of the invention, for a classification method of the first directional sensing line 110 and the second directional sensing line 130, reference may be made to the foregoing embodiment, and it will not be further described herein. The sensing method of the touch panel 600 is, if the touch position falls within a region where two sets of the physically connected $i^{th}$ first directional sensing lines 110a and the $x^{th}$ second directional sensing lines 130a are intersected with each other, the sensing method of the third sensing region S3 in FIG. 6C will be used for sensing. If the touch position falls within a region where the $i^{th}$ first directional sensing lines 110 with the physical connection and the $y^{th}$ second directional sensing lines 130b that are not physically connected to the first directional sensing lines 110 are intersected with each other, the sensing method of the first sensing region S1 in FIG. 6A will be used for sensing.

In a plurality of embodiments of the invention, the first directional sensing lines 110 may be spaced apart from each other at equal intervals, or spaced apart at unequal intervals from each other. The second directional sensing lines 130 may also be spaced apart from each other at equal intervals, or be spaced apart at unequal intervals from each other. Persons of ordinary skill in the art may make the appropriate choice based on actual needs.

In summary, the first directional sensing line and the second directional sensing line of the touch panel of the invention that are not intersected with each other in the specific sensing region share a common outer lead so that the number of outer leads may be substantially reduced, thereby reducing the border size of the touch screen and enlarging the borderless region at the same time. The first directional sensing line and the second directional sensing line which share a common outer lead also share a common signal transmission channel, so the number of signal transmission channels required is reduced, and the requirements of the driving circuit are lower. The sensing method of the touch panel of the invention is choosing one of the outer leads to input a driving signal and reading a sensing signal from the other outer leads, such that even though a portion of the first directional sensing lines and a portion of the second directional sensing lines of the touch panel of the invention share outer leads, full-screen touch sensing can be achieved. Therefore, the touch panel of the invention may significantly reduce the number of outer leads and signal transmission channels, thereby reducing the overall production cost and having a faster refresh rate and operational speed.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A touch panel, comprising:
    first directional sensing lines each extending through a specific sensing region;
    second directional sensing lines, each of the second directional sensing lines is intersected with at least a portion of the first directional sensing lines, wherein an $i^{th}$ line of the first directional sensing lines is not intersected with an $x^{th}$ line of the second directional sensing lines in the specific sensing region, the $i^{th}$ line of the first directional sensing lines is physically connected with the $x^{th}$ line of the second directional sensing lines outside the specific sensing region, and i and x are both positive integers; and
    outer leads, connecting the first directional sensing lines and the second directional sensing lines to a driving circuit, and the $i^{th}$ line of the first directional sensing lines and the $x^{th}$ line of the second directional sensing lines share a common outer lead.

2. The touch panel according to claim 1, wherein the line of the first directional sensing lines is intersected with M second directional sensing lines in the specific sensing region, a $j^{th}$ line of the first directional sensing lines is intersected with N second directional sensing lines in the specific sensing region, j, M, N are all positive integers, i is different from j, and M is smaller than N.

3. The touch panel according to claim 2, wherein the $j^{th}$ line of the first directional sensing lines is intersected with all the second directional sensing lines in the specific sensing region.

4. The touch panel according to claim 2, wherein a width of the specific sensing region at the $i^{th}$ line of the first directional sensing lines is smaller than a width at the $j^{th}$ line of the first directional sensing lines.

5. The touch panel according to claim 1, wherein the $x^{th}$ line of the second directional sensing lines is intersected K first directional sensing lines in the specific sensing region, a $y^{th}$ line of the second directional sensing lines is intersected with L first directional sensing lines in the specific sensing region, y, K, L are all positive integers, and K is smaller than L.

6. The touch panel according to claim 5, wherein the $y^{th}$ line of the second directional sensing lines is intersected with all the first directional sensing lines in the specific sensing region.

7. The touch panel according to claim 1, wherein the outer leads form continuous lines respectively with the first directional sensing lines and the second directional sensing lines connected to the outer leads.

8. The touch panel according to claim 1, wherein the common outer lead shared by the $i^{th}$ line of the first directional sensing lines and the $x^{th}$ line of the second directional sensing lines is connected to the $i^{th}$ line of the first directional sensing lines near an edge of the specific sensing region.

9. The touch panel according to claim 1, wherein the common outer lead shared by the $i^{th}$ line of the first directional sensing lines and the $x^{th}$ line of the second directional sensing lines is connected to the $x^{th}$ line of the second directional sensing lines near an edge of the specific sensing region.

10. The touch panel according to claim 1, wherein the common outer lead shared by the $i^{th}$ line of the first directional sensing lines and the $x^{th}$ line of the second directional sensing lines is connected to the physical connection between the $i^{th}$ line of the first directional sensing lines and the $x^{th}$ line of the second directional sensing lines near an edge of the specific sensing region.

11. The touch panel according to claim 1, wherein an $i1^{th}$ line of the first directional sensing lines is physically connected to an $x1^{th}$ line of the second directional sensing lines, an $i2^{th}$ line of the first directional sensing lines is physically connected to an $x2^{th}$ line of the second directional sensing lines, x1, x2, i1 and i2 are all positive integers, and a difference between x1 and x2 is different from a difference between i1 and i2.

12. The touch panel according to claim 11, wherein a $Y^{th}$ line of the second directional sensing lines exists between the $x1^{th}$ line of the second directional sensing lines and the $x2^{th}$ line of the second directional sensing lines, and the $Y^{th}$ line of the second directional sensing lines is electrically independent of all the first directional sensing lines.

* * * * *